United States Patent
Miyashita

(10) Patent No.: US 12,109,685 B2
(45) Date of Patent: Oct. 8, 2024

(54) ALIGNMENT DEVICE

(71) Applicant: Koganei Corporation, Koganei (JP)

(72) Inventor: Takeshi Miyashita, Koganei (JP)

(73) Assignee: Koganei Corporation, Koganei (JP)

( * ) Notice: Subject to any disclaimer, the term of this patent is extended or adjusted under 35 U.S.C. 154(b) by 771 days.

(21) Appl. No.: 17/285,887

(22) PCT Filed: Aug. 13, 2019

(86) PCT No.: PCT/JP2019/031850
§ 371 (c)(1),
(2) Date: Apr. 15, 2021

(87) PCT Pub. No.: WO2020/079939
PCT Pub. Date: Apr. 23, 2020

(65) Prior Publication Data
US 2021/0339404 A1    Nov. 4, 2021

(30) Foreign Application Priority Data

Oct. 15, 2018 (JP) .................. 2018-194187

(51) Int. Cl.
*B25J 15/04*     (2006.01)
*B25J 15/00*     (2006.01)
*B25J 17/02*     (2006.01)

(52) U.S. Cl.
CPC ....... *B25J 15/0408* (2013.01); *B23B 2231/22* (2013.01); *B25J 15/0047* (2013.01); *B25J 17/0233* (2013.01); *Y10T 279/25* (2015.01)

(58) Field of Classification Search
CPC ............... B25J 15/0408; B25J 17/0233; B23B 2231/22; B23B 31/36; B23Q 3/186; Y10T 279/25
See application file for complete search history.

(56) References Cited

U.S. PATENT DOCUMENTS

| | | |
|---|---|---|
| 2003/0132583 A1 | 7/2003 | Grobbel |
| 2007/0163377 A1* | 7/2007 | Miyazawa ............ H01L 21/682 414/735 |
| 2014/0270926 A1* | 9/2014 | Norton ................. B25J 17/0233 403/322.2 |

(Continued)

FOREIGN PATENT DOCUMENTS

| | | |
|---|---|---|
| JP | S55031557 A | 3/1980 |
| JP | H04129625 A | 4/1992 |

(Continued)

*Primary Examiner* — Sunil K Singh
*Assistant Examiner* — Eric Daniel Whitmire
(74) *Attorney, Agent, or Firm* — Gregory L. Mayback; Mayback IP Law, P.A.

(57) ABSTRACT

An alignment device has a support base attached to a conveying device, and a mounting plate to which a gripping member is attached, and the mounting plate is transferably abutted on a fastening holder that is fixed to the support base. A movable ring fixed to the mounting plate has a sliding part that is transferably engaged with the fastening holder. A first holding mechanism arranged between the fastening holder and the mounting plate locks the mounting plate to the fastening holder. A second holding mechanism provided between the fastening holder and the movable ring cancels a first-direction force of the mounting plate.

10 Claims, 14 Drawing Sheets

(56) References Cited

U.S. PATENT DOCUMENTS

2020/0030996 A1  1/2020  Miyashita

FOREIGN PATENT DOCUMENTS

| | | |
|---|---|---|
| JP | H1142586 A | 2/1999 |
| JP | 2000094377 A | 4/2000 |
| JP | 2003211310 A | 7/2003 |
| WO | 2005063456 A1 | 7/2005 |
| WO | 2018066284 A1 | 4/2018 |

* cited by examiner

FIG. 6
(A)
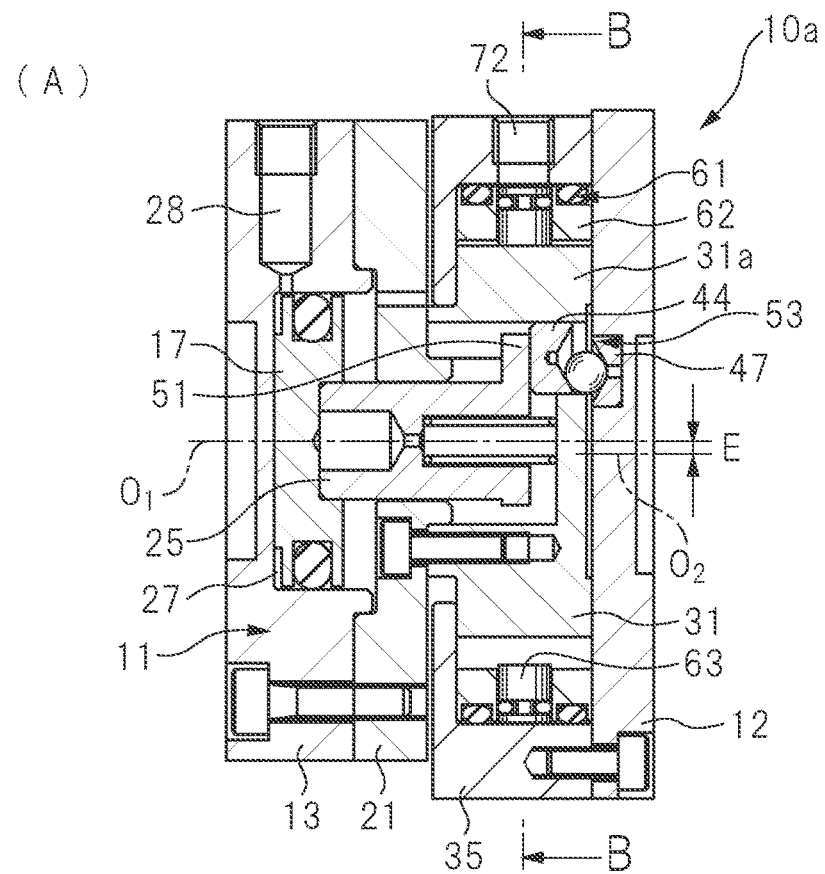
(B)
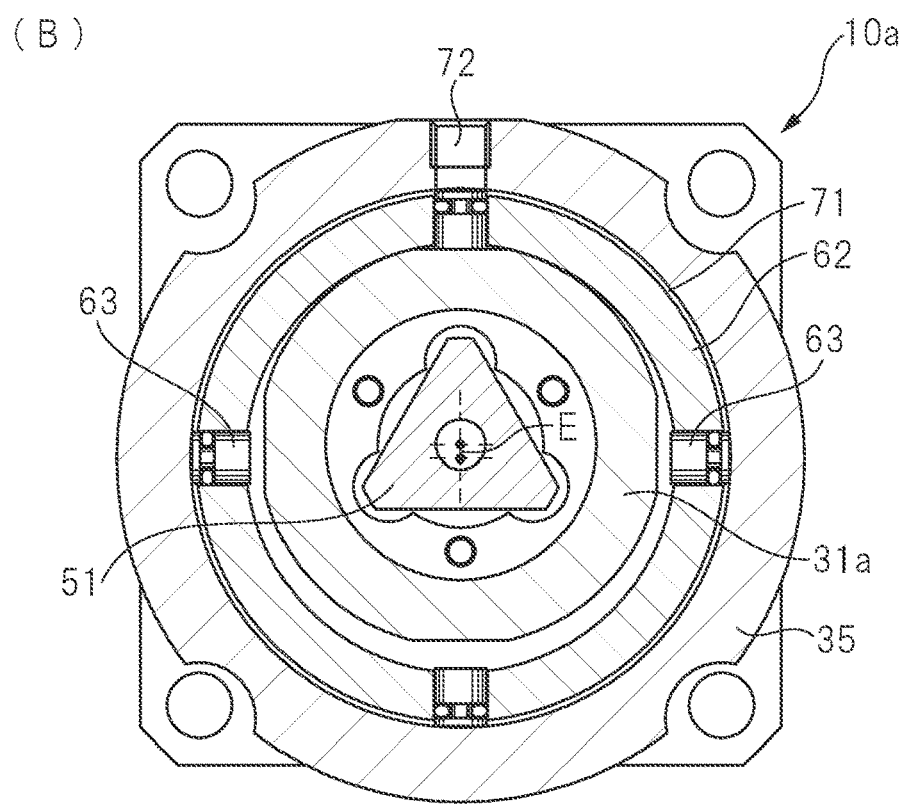

(A)

(B)

FIG. 8
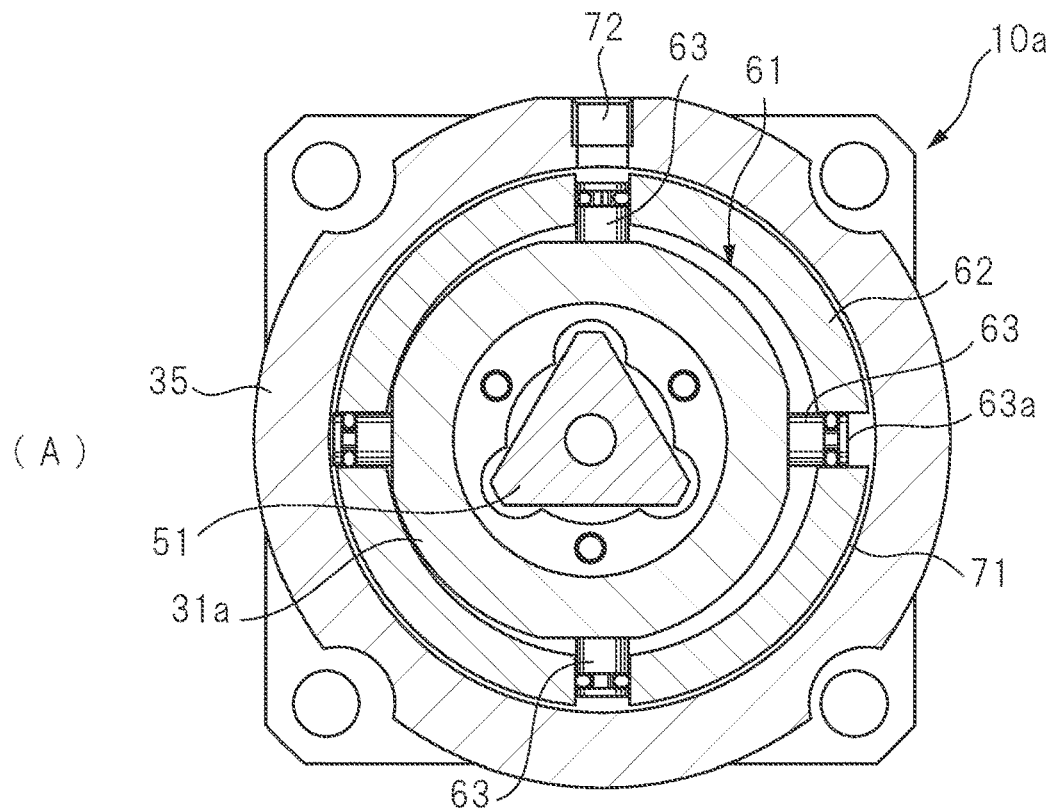
(A)
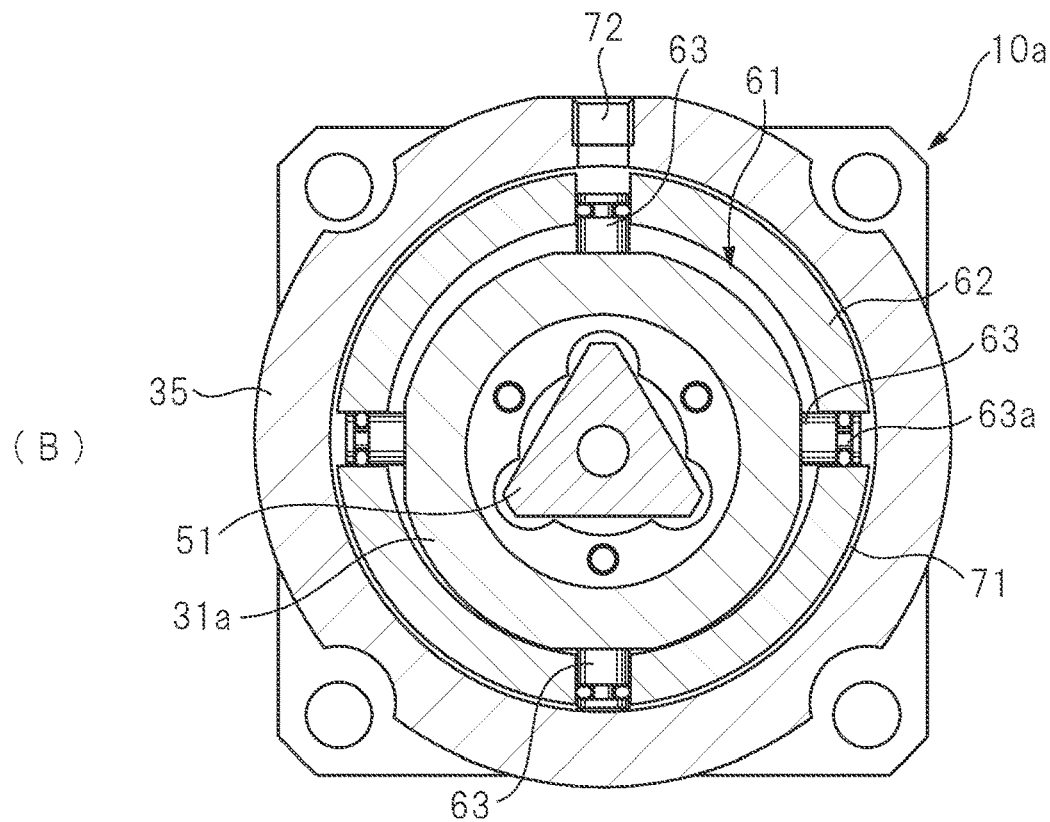
(B)

FIG. 9
(A)
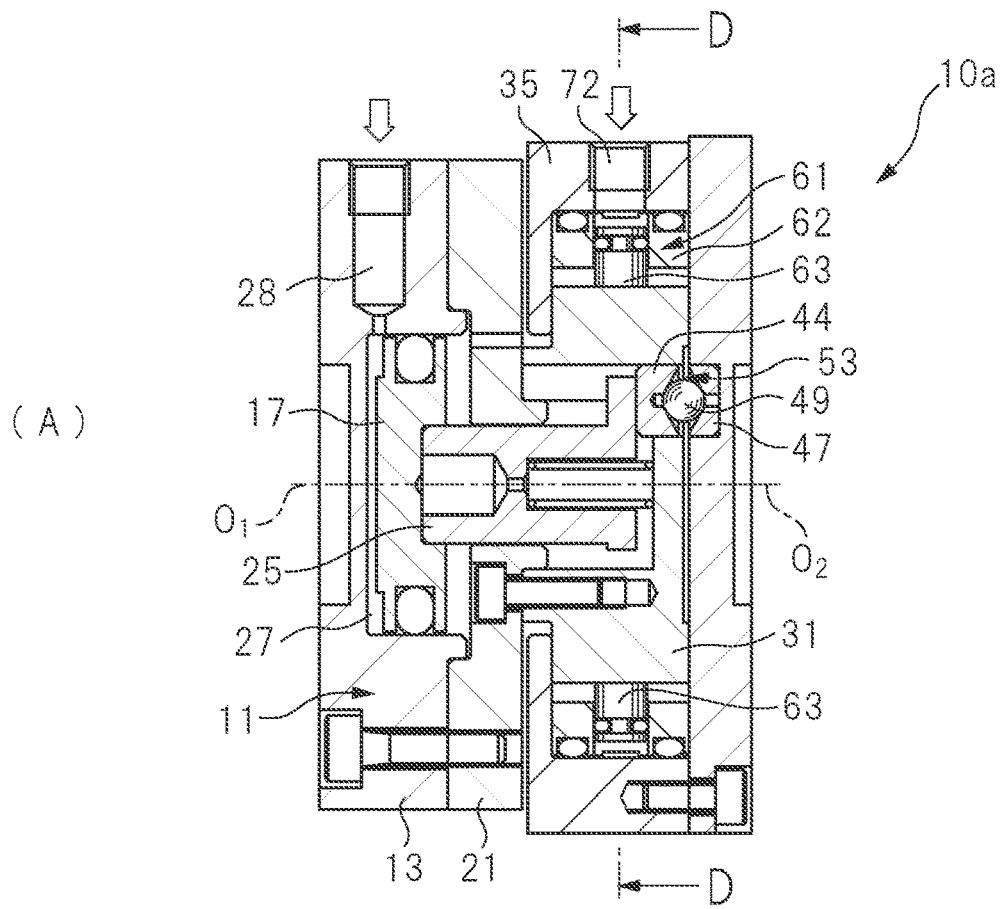
(B)
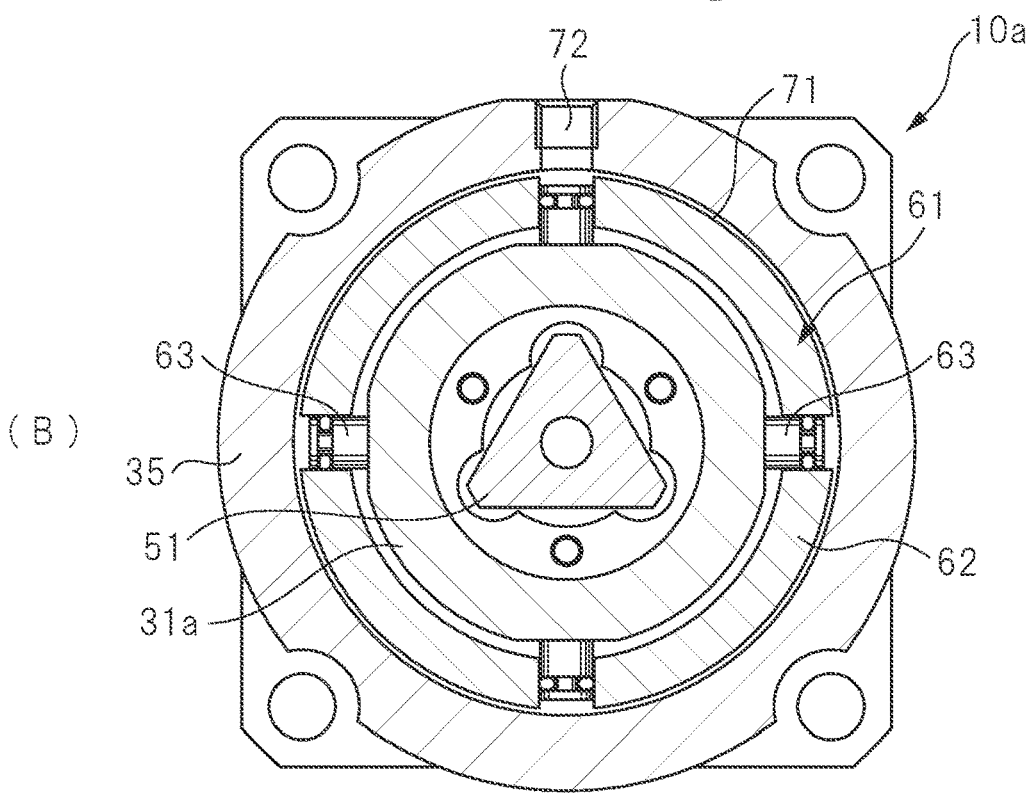

FIG. 11
(A)
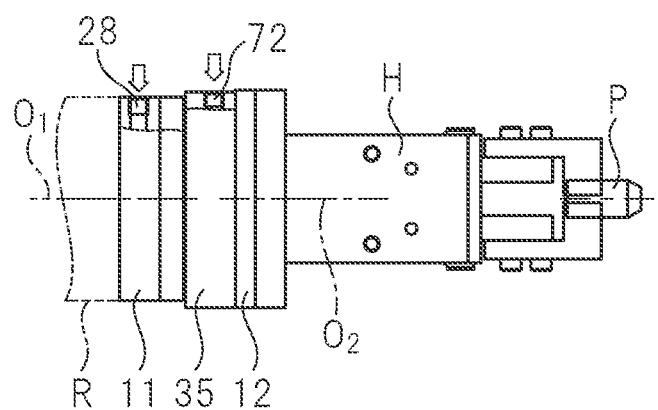
(B)
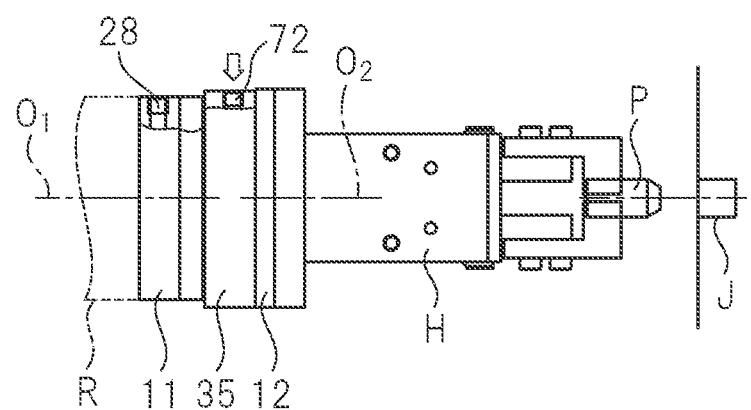

FIG. 12
(A)
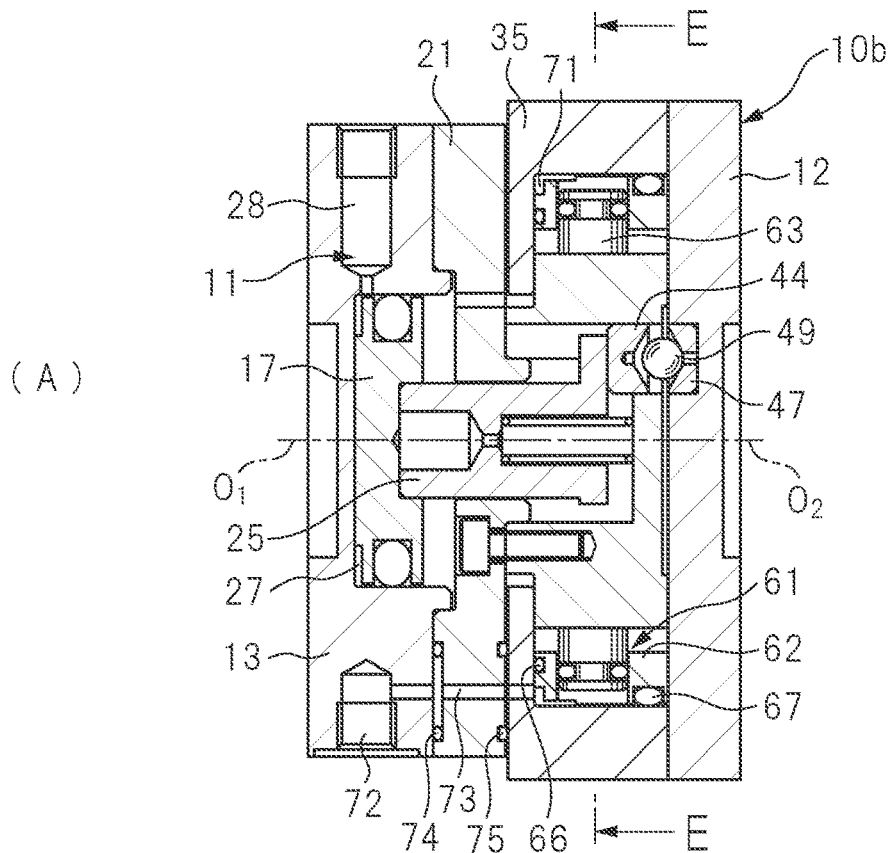
(B)
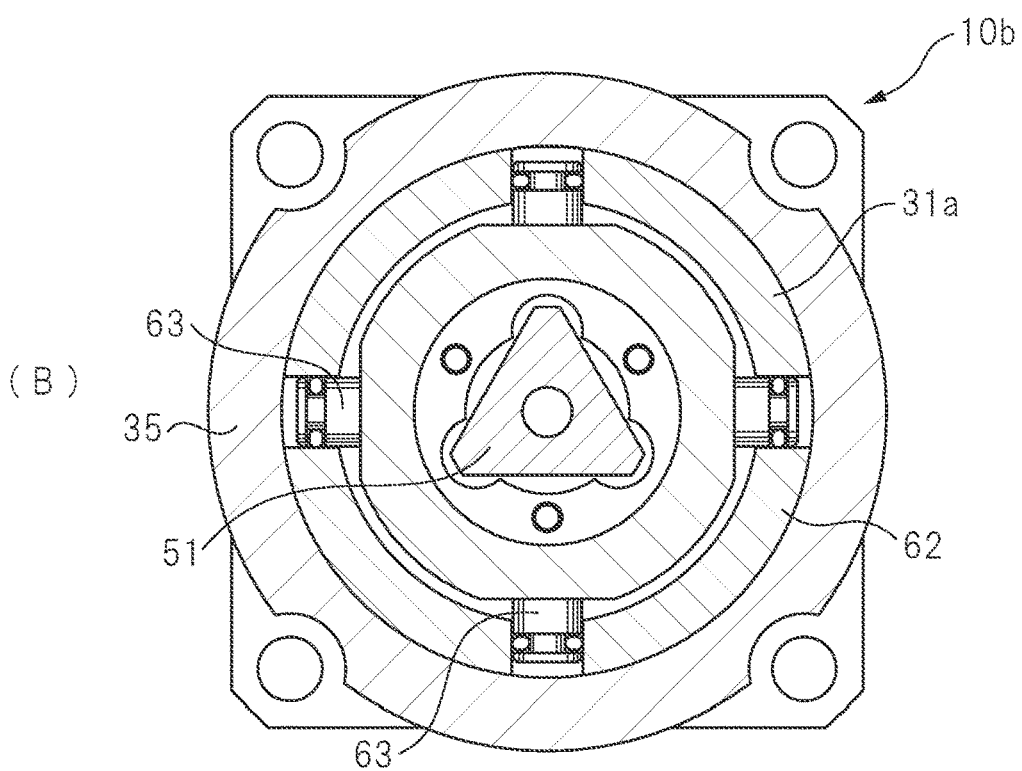

FIG. 13
(A)
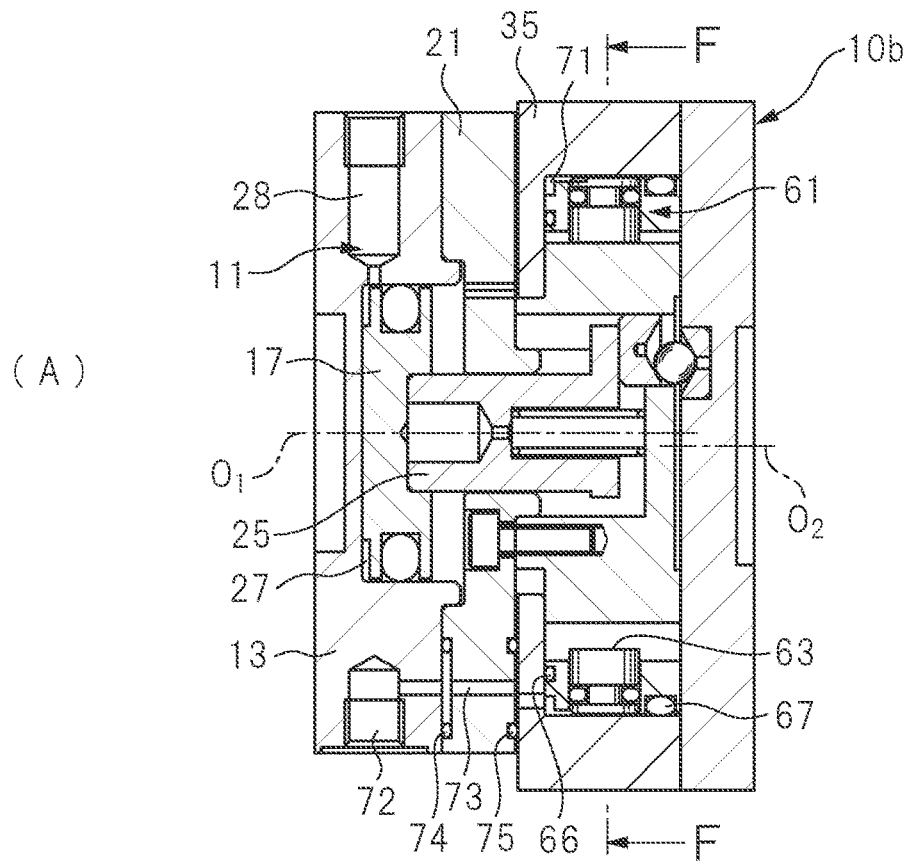
(B)
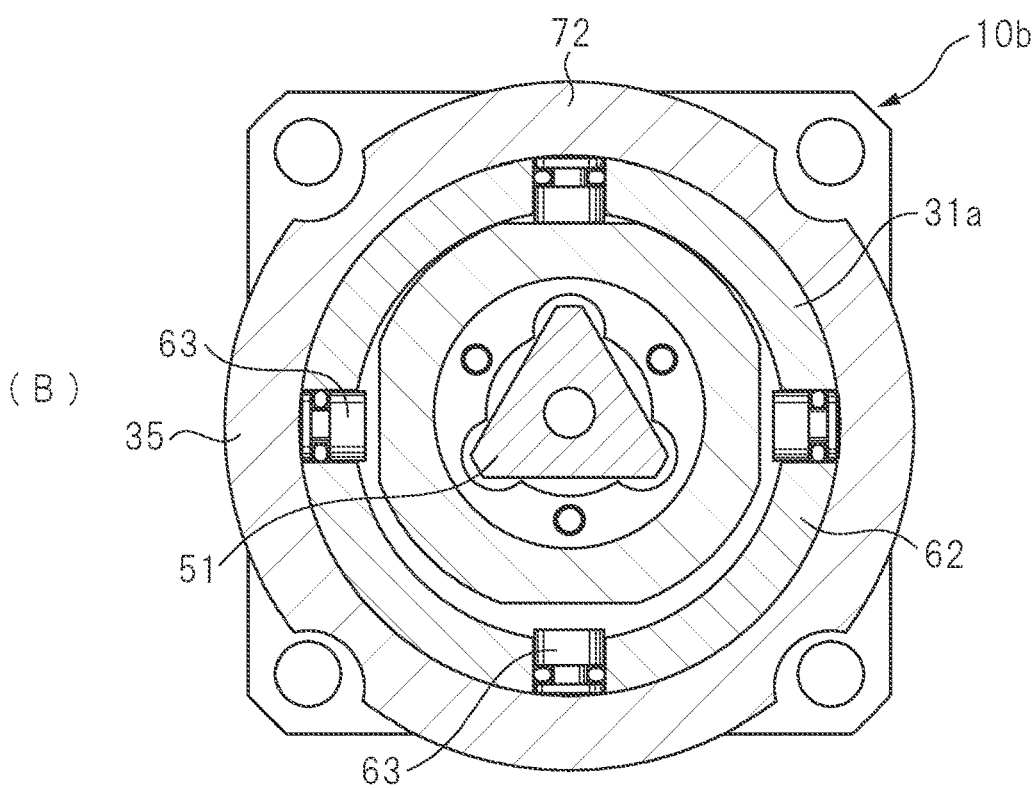

FIG. 14
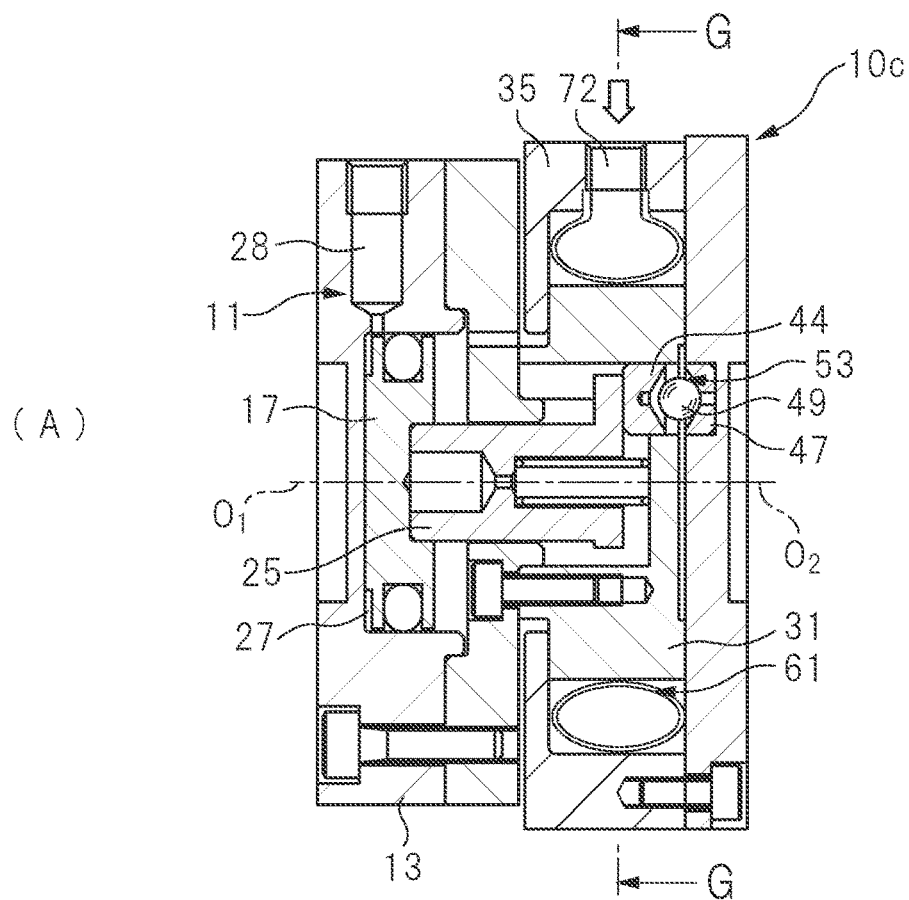
(A)
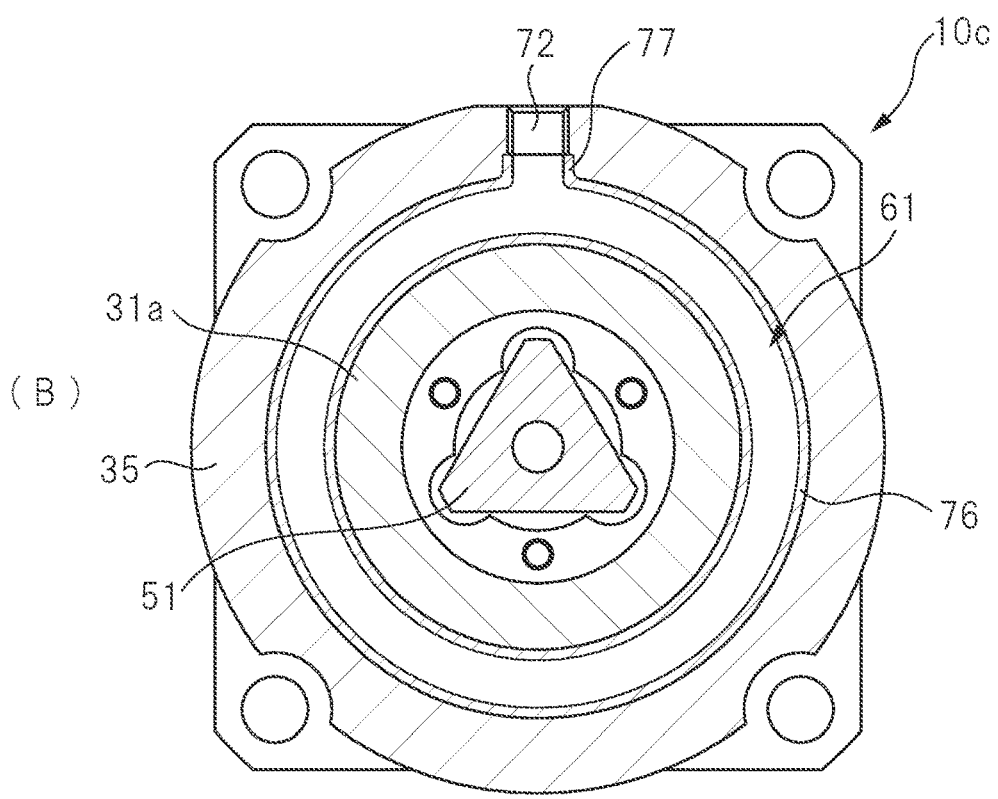
(B)

ALIGNMENT DEVICE

CROSS-REFERENCE TO RELATED APPLICATIONS

This application claims the priority, under 35 U.S.C. § 371, of International Application No. PCT/JP2019/031850, filed Aug. 13, 2019, which application claims priority to JP Patent Application No. 2018-194187, filed Oct. 15, 2018; the prior applications are herewith incorporated by reference in their entirety.

STATEMENT REGARDING FEDERALLY SPONSORED RESEARCH OR DEVELOPMENT

Not Applicable

FIELD OF THE INVENTION

The present invention relates to an alignment device that absorbs a positioning error of an object to be transported.

BACKGROUND OF THE INVENTION

A conveying device such as a robot arm is used to transport a transported object such as a workpiece from a first position to a second position. A gripping member such as an air chuck for gripping the transported object is attached to the conveying device.

For example, the workpiece arranged at the first position is gripped by the air chuck and is transported to the second position by the robot arm. When the air chuck is transported to each position by the robot arm, a relative positional deviation between the air chuck and each position, that is, a positioning error may occur. In order to absorb these positioning errors, the air chuck that is a gripping member is attached to the robot arm, which is a conveying device, via, for example, an alignment device as disclosed in Patent Document 1. This alignment device is also called a compliance unit or compliance module.

The alignment device has: a support member, that is, a support base which is attached to the conveying device; and a mounting plate to which the gripping member is attached. The gripping member attached to the mounting plate is set to either of: a state of being made coaxial with a central axis of the support base and being locked, that is, a holding mode; or a non-holding mode which is transferable in a radial direction with respect to the central axis of the support base, that is, is transferable in a movable direction with respect to the central axis of the support base.

Patent Document 1: Japanese Patent Application Laid-open No. 2000-94377

SUMMARY OF THE INVENTION

For example, when the air chuck grips a pin held perpendicularly to a first position, the pin may be slightly displaced with respect to the air chuck. At this time, if the alignment device is in the non-holding mode, the air chuck can transfer in the radial direction with respect to the central axis of the support base, so that such positional displacement is absorbed. That is, since the central axis of the air chuck and a central axis of the pin are aligned with each other, the air chuck can grip the pin. Further, when the pin gripped by the air chuck is inserted into an insertion hole that is a second position and is vertically arranged, the air chuck may be slightly displaced with respect to the insertion hole. At this time, if the alignment device is in the non-holding mode, the air chuck can transfer in the radial direction with respect to the central axis of the support base, that is, transfer in the movable direction with respect to the central axis of the support base, so that such position displacement is absorbed. Namely, since the central axis of the air chuck and the central axis of the insertion hole are aligned with each other, the air chuck can insert the pin into the insertion hole. In this way, the mounting plate to which the gripping member such as the air chuck is attached transfers in the radial direction, that is, in the movable direction with respect to the support base, so that the positioning errors of the workpiece can be absorbed.

Since the alignment device is attached to various conveying devices and used for conveying the transported objects such as various workpieces and jigs, an amount of alignment movement of the mounting plate for absorbing the positioning errors is set to a constant value based on a case where the positioning error is the maximum.

When the alignment device is in the non-holding mode, the mounting plate is transferable in the movable direction. Consequently, a force in a first direction (displacement force of the positioning error of the mounting plate with respect to the support base) may be unexpectedly generated due to conditions such as a posture of the alignment device, weight of the mounting plate, and a load of the air chuck.

The unexpected force may be caused, for example, in a case where a workpiece such as a pin whose central axis is held horizontally is gripped and conveyed by the air chuck or where the pin is be inserted into the horizontal insertion hole. In such a case, when the robot arm is driven and the central axis of the mounting plate to which the air chuck is attached is positioned in a horizontal direction, the central axis of the support base of the alignment device is also positioned in the horizontal direction. Consequently, the force in the first direction is generated due to the weight of the mounting plate, the load of the air chuck, or the like, and the mounting plate deviates (shifts) downward. An amount of deviation thereof is the maximum amount of transference (movement) of the alignment device. In this way, the mounting plate transfers in the movable direction.

Even if trying to grip the pin in the above-mentioned state, the air chuck may be unable to grip the pin since the central axis of the air chuck is largely deviated from the central axis of the support base. Similarly, when the pin gripped by the air chuck is inserted into the horizontal insertion hole, the central axis of the pin is greatly deviated from the central axis of the support base, which may bring impossibility of the insertion of the pin even if the central axis of the support base and the insertion hole is aligned with each other. Even if the pin can be gripped or inserted, the robot arm is required to have high positioning accuracy.

For this reason, like a case where a reference axis such as the central axis of the gripping member such as the air chuck is made horizontal to grip the transported object or insert it into the insertion hole, the conventional alignment device cannot apply to a case where the force in the first direction is applied to a reference axis of the support base, which limits the posture of the alignment device and limits use application of the alignment device.

An object of the present invention is to provide an alignment device applicable to various conveying devices by providing a mechanism for canceling a first-direction force applied to the mounting plate while the mounting plate is allowed to be transferable in the movable direction.

An alignment device of the present invention includes: a support base having a cylinder hole for incorporating an axially transferable lock piston, the support base being attached to a conveying device; a mounting plate transferably abutted in a movable direction on a front surface of a fastening holder that is fixed to the support base, a gripping member being attached to the mounting plate; a movable ring provided with a sliding part that is transferably engaged with the fastening holder in the movable direction, the movable ring being fixed to the mounting plate; a first holding mechanism arranged between the fastening holder and the mounting plate, and having a first holding force that is driven by the lock piston and causes a reference axis of the mounting plate to conform with and lock a reference axis of the fastening holder; and a second holding mechanism provided between the fastening holder and the movable ring, and having a second holding force that admits a state where the mounting plate is transferable in the movable direction and that cancels a first-direction force applied to the mounting plate, in which the second holding mechanism is turned on and off by a fluid pressure actuating mechanism.

When the central axis of the alignment device is set to a posture pointed in a horizontal direction etc. and the force in the first direction is applied to the mounting plate, the force in the first direction is canceled and an alignment function can be used. Consequently, even when the force in the first direction is applied to the mounting plate, the posture of the alignment device is not restricted, so that the alignment device can be applied to various conveying devices and use application of the alignment device can be expanded.

BRIEF DESCRIPTIONS OF THE DRAWINGS

FIG. 6(A) is a vertically sectional view showing a state where the alignment device is held horizontally and a mounting plate on the tip end side is displaced downward due to its own weight;

FIG. 6(B) is a sectional view taken along line B-B of FIG. 6(A);

FIG. 8(A) is a horizontally sectional views showing a state where the mounting plate is transferred under the state where the second holding mechanism is operated;

FIG. 8(B) is a horizontally sectional views showing a state where the mounting plate is transferred under the state where the second holding mechanism is operated;

FIG. 9(A) is a vertically sectional view showing a state where the first holding mechanism and the second holding mechanism are operated;

FIG. 9(B) is a sectional view taken along line D-D in FIG. 9(A);

FIG. 11(A) is a view showing the process of inserting the pin, which is a workpiece, into an insertion hole by the air chuck;

FIG. 11(B) is a view showing the process of inserting the pin, which is a workpiece, into the insertion hole by the air chuck;

FIG. 12(A) is a vertically sectional view showing an exemplary embodiment of an alignment device;

FIG. 12(B) is a sectional view taken along line E-E of FIG. 12(A);

FIG. 13 is a vertically sectional view showing a state where a mounting plate of the alignment device shown in FIG. 12 is displaced and transferred due to its own weight;

FIG. 13(B) is a sectional view taken along line F-F in FIG. 13(A);

FIG. 14(A) is a vertically sectional view showing an exemplary embodiment of an alignment device; and FIG. 14(B) is a sectional view taken along line G-G in FIG. 14(A).

DETAILED DESCRIPTION OF THE EMBODIMENTS

Figure 1:
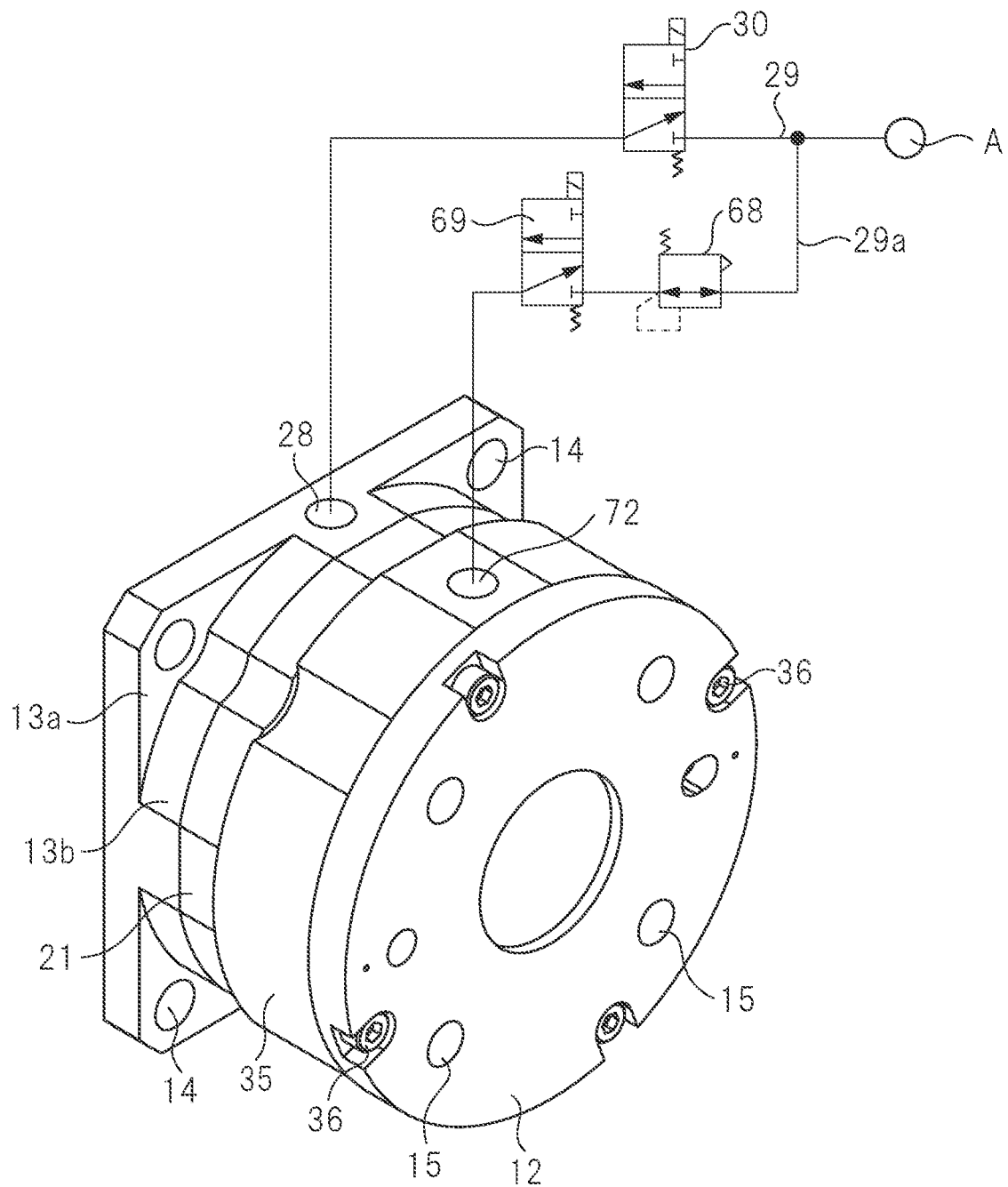
FIG. 1 is a perspective view showing an exemplary embodiment of an alignment device.
Figure 2:
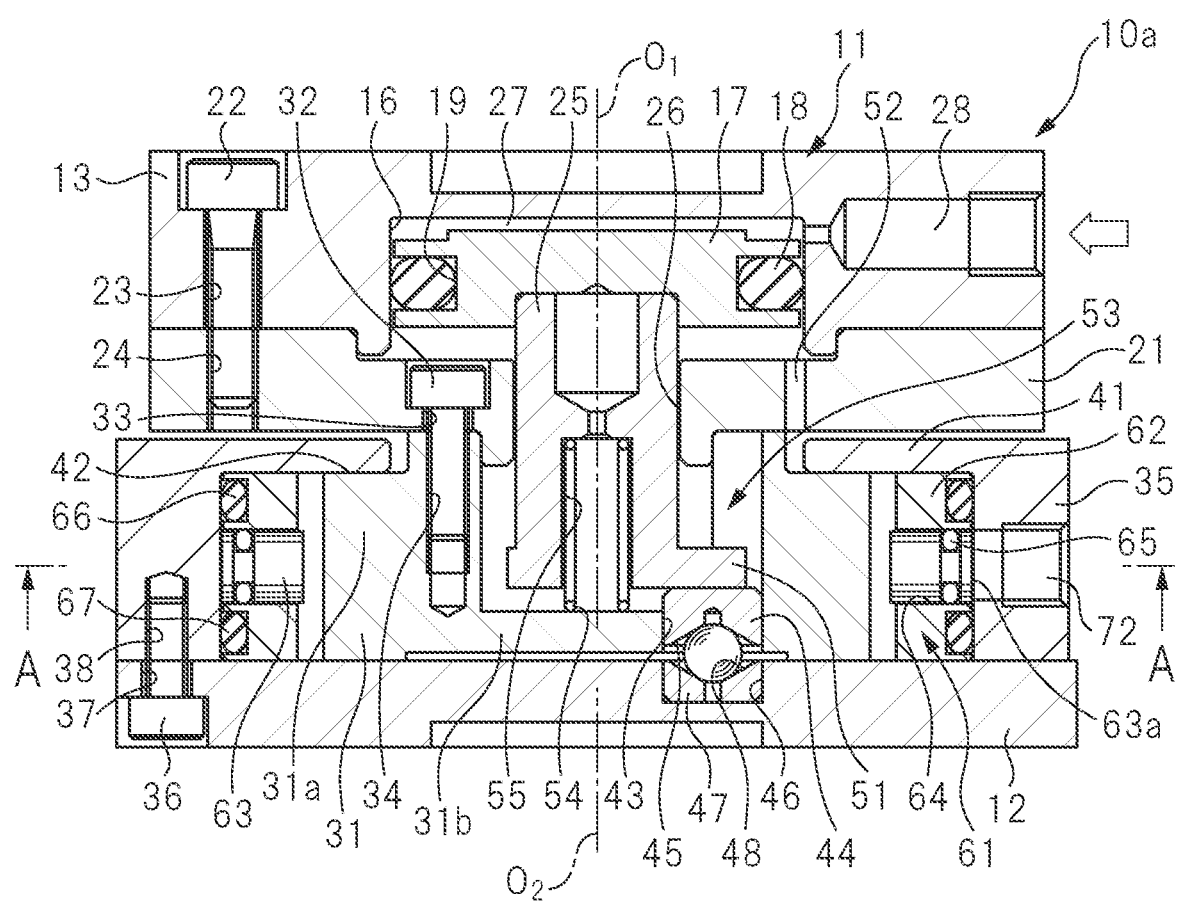
FIG. 2 is a vertically sectional view of the alignment device shown in FIG. 1.

Hereinafter, embodiments of the present invention will be described in detail with reference to the drawings. In each embodiment, members having a common function are denoted by the same reference numeral. An alignment device 10a has a support base 11 and a mounting plate 12 as shown in FIGS. 1 and 2. The support base 11 is attached to a conveying device such as a robot arm, and a gripping member such as an air chuck is attached to the mounting plate 12.

Figure 4:
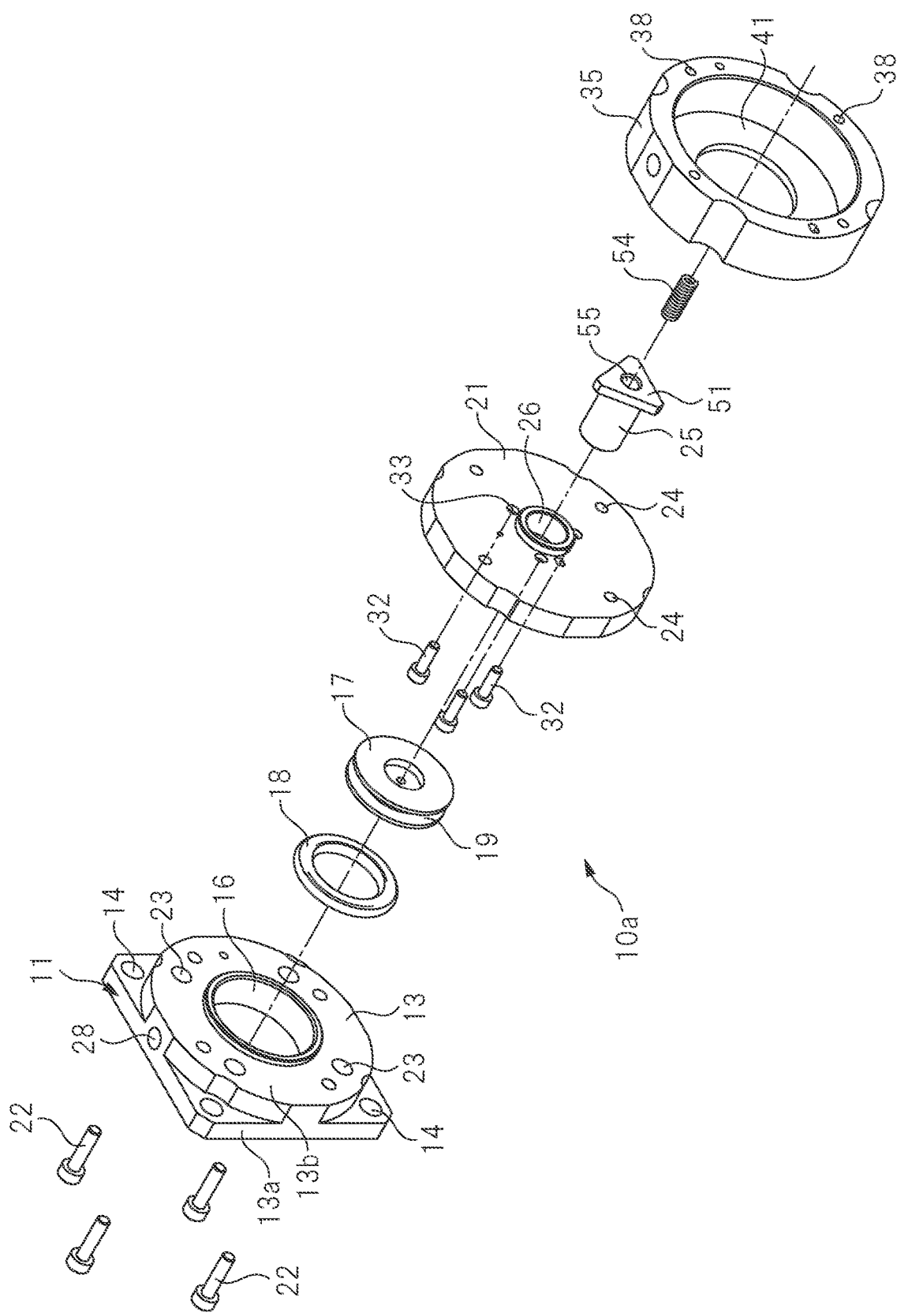
FIG. 4 is an exploded perspective view of a member on a rear end side of the alignment device shown in FIGS. 1 to 3.

The support base 11 has a base block 13 and, as shown in FIGS. 1 and 4, the base block 13 includes a quadrilateral portion 13a and a ring portion 13b integrated with the quadrilateral portion 13a. The base block 13 is provided with a plurality of mounting holes 14 for attaching the support base 11 to a not-shown conveying device. Meanwhile, the mounting plate 12 is provided with a plurality of mounting holes 15 for attaching a not-shown gripping member to the mounting plate 12. In the alignment device 10a, the support base 11 serves as a rear side part, and the mounting plate 12 serves as a front side part.

As shown in FIG. 2, a bottomed cylinder hole 16 is provided in the base block 13, and a lock piston 17 is incorporated into the cylinder hole 16 so as to be reciprocable in an axial direction. A sealing member 18 for sealing a space between the lock piston 17 and the cylinder hole 16 is attached into an annular groove 19 provided in the lock piston 17. A circular support disk 21 is attached to a front surface of the base block 13 by four screw members 22. The screw member 22 penetrates the mounting hole 23 formed in the base block 13 and is screwed into a screw hole 24 formed in the support disk 21. As shown in FIG. 2, the support base 11 is assembled by the base block 13 and the support disk 21.

As shown in FIG. 2, the piston rod 25 is attached to a front surface of the lock piston 17, and the piston rod 25 penetrates a through hole 26 formed in the support disk 21 and projects in front of the support disk 21. A pressure chamber 27 is formed by the bottomed cylinder hole 16 and the lock piston 17, and a supply/discharge port 28 communicating with the pressure chamber 27 is formed in the base block 13. As shown in FIG. 1, a directional control valve 30 is provided in a pipe 29 that connects an air pressure source A and the supply/discharge port 28. When the directional control valve 30 is turned on to supply compressed air to the pressure chamber 27 from the supply/discharge port 28, the lock piston 17 drives the piston rod 25 in a protruding direction thereof.

Figure 5:
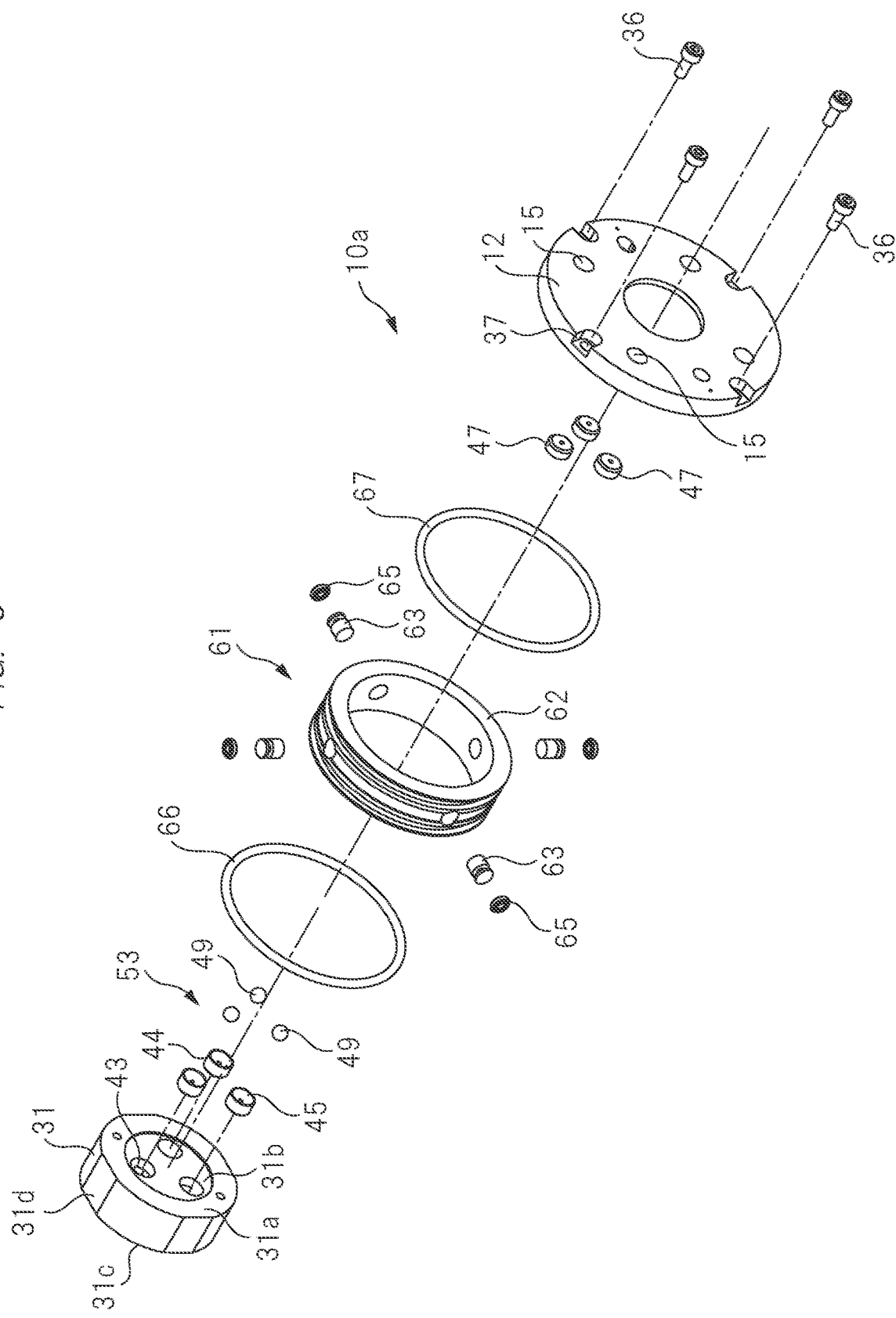
FIG. 5 is an exploded perspective view of a member on a tip end side of the alignment device shown in FIGS. 1 to 3.

A fastening holder 31 is fixed by a plurality of screw members 32 to a front surface of the support base 11 that is provided with the base block 13 and the support disk 21. The fastening holder 31 includes a ring part 31a and an end plate part 31b integrated with the ring part 31a. As shown in FIG. 5, an outer peripheral surface of the ring part 31a is composed of a plurality of arcuate surfaces 31c and a plurality of flat surfaces 31d. Central axes of the arcuate surfaces 31c are coaxial and their radii are equal. The screw member 32 penetrates a mounting hole 33 formed in the support disk 21 and is screwed into a screw hole 34 formed in the ring part 31a. In this way, the fastening holder 31 is fixed to the support disk 21 by the screw member 32.

A movable ring 35 is attached to a back surface of the mounting plate 12 by a plurality of screw members 36. The screw member 36 penetrates a mounting hole 37 formed in the mounting plate 12 and is screwed into a screw hole 38 formed in the movable ring 35. Consequently, the movable ring 35 is fixed to the mounting plate 12. The movable ring 35 has a ring-shaped sliding part 41 protruding radially inwardly from an inner peripheral surface thereof, and the sliding par 41 is integrated with a back surface part of the movable ring 35. The sliding part 41 is engaged with a guide surface 42 provided on a back surface side of the fastening holder 31, and is transferable in a movable direction. The movable direction is a direction perpendicular to a central axis O1 of the piston rod 25, that is, a radial direction of the support base 11.

As shown in FIG. 5, three mounting holes 43 are formed in the end plate part 31b of the fastening holder 31, and the mounting holes 43 penetrate the end plate part 31b. A first holding portion 44 is attached into each mounting hole 43, and the holding portion 44 is provided to the fastening holder 31 so as to be transferable in a direction parallel to the central axis O1, that is, in a transferring direction of the lock piston 17. As shown in FIG. 2, a tapered surface 45 is formed on the holding portion 44, and the tapered surface 45 expands forward so that its inner diameter gradually increases from a central part toward a front surface thereof.

As shown in FIG. 2, a bottomed mounting hole 46 is formed on a back surface of the mounting plate 12. The three mounting holes 46 are formed so as to face the mounting holes 43, and a second holding portion 47 is fixed to each mounting hole 46. A tapered surface 48 is formed on the holding portion 47, and the tapered surface 48 expands rearward so that its inner diameter gradually increases from its central part toward the holding portion 47. A steel ball 49 is arranged between the holding portion 44 and the holding portion 47.

As shown in FIG. 4, a flange 51 is provided at a tip of the piston rod 25, and a back surface of the holding portion 44 is abutted on the flange 51. The flange 51 is substantially triangular, and the holding portions 44 are abutted on its three apex portions, respectively. When the compressed air is supplied to the pressure chamber 27 from the supply/discharge port 28, as shown in FIG. 2 the piston rod 25 is driven forward and the ball 49 is tightened between the holding portion 44 and the holding portion 47, so that both central parts of the tapered surfaces 45, 48 are positioned so as to coincide with each other. When the lock piston 17 is driven forward, air between the lock piston 17 and the support disk 21 is discharged outside through a breath hole 52.

The central axis O1 of the piston rod 25 is used as a reference axis of the fastening holder 31, and a central axis O2 of the mounting plate 12 is used as a reference axis of the mounting plate 12. As shown in FIG. 2, in a state where both central parts of the tapered surfaces 45, 48 conform with each other, both reference axes are aligned to conform with each other and the mounting plate 12 is locked to the support base 11. In this way, the holding portions 44, 47 arranged between the fastening holder 31 and the mounting plate 12 form a first holding mechanism 53 that causes the both reference axes to conform with each other. A state where the first holding mechanism 53 is operating (ON) is set as a holding mode. In the holding mode, both reference axes are caused to conform with each other and are locked due to a first holding force by the first holding mechanism 53.

A compression coil spring 54 is incorporated into an accommodating hole 55 formed in the piston rod 25. One end of the compression coil spring 54 abuts on a bottom surface of the accommodating hole 55, and the other end thereof abuts on a back surface of the end plate portion 31b, so that a spring force in a retreating direction is applied to the piston rod 25 and the lock piston 17. Therefore, when the compressed air in the pressure chamber 27 is discharged, the piston rod 25 transfers (moves) backward due to the spring force and a lock of the mounting plate 12 is released. Under this state, when an external force in a radial direction is applied to the mounting plate 12 with respect to the support base 11, the mounting plate 12 can transfer in the movable direction. Even when the piston rod 25 reaches and is at a backward limit position, a diameter of the ball 49 is larger than a distance between the holding portions 44 and 47 facing each other. Thus, the ball 49 does not come off between the holding portions 44 and 47.

Figure 3:
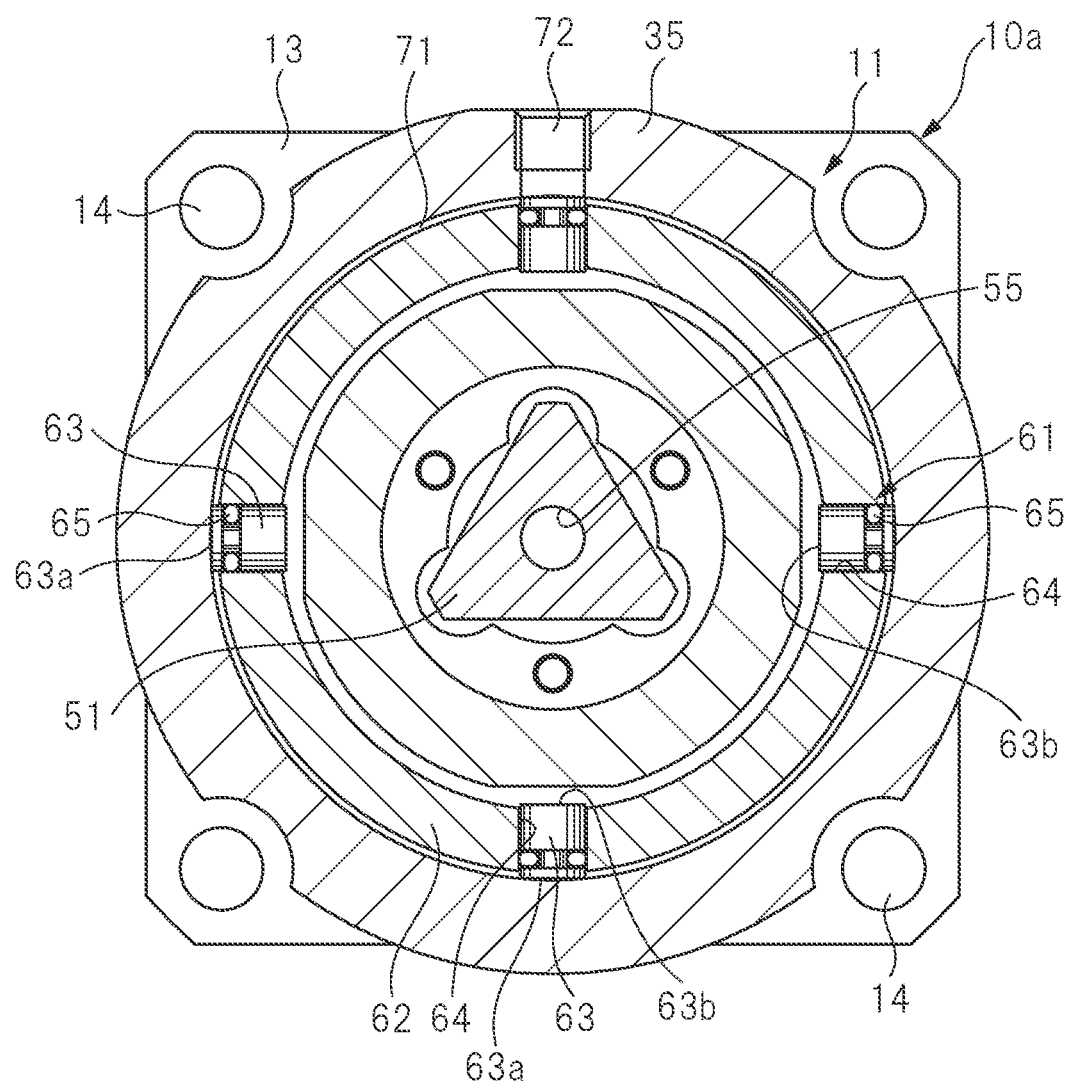
FIG. 3 is a sectional view taken along line A-A in FIG. 2.

A second holding mechanism 61, which cancels a force in a first direction, that is, a force in a direction of shifting the reference axis of the mounting plate 12 from the reference axis of the fastening holder 31, is arranged between the fastening holder 31 and the movable ring 35. As shown in FIGS. 3 and 5, the second holding mechanism 61 has a support ring 62, which is fixed inside the movable ring 35. Four adjusting pistons 63 are attached to the support ring 62 so as to be spaced evenly in a circumferential direction of the support ring 62. Each of the adjusting pistons 63 is transferably attached into a guide hole 64 that is provided so as to radially penetrate the support ring 62. A sealing member 65 that contacts with the guide hole 64 is provided in the adjusting piston 63.

As shown in FIG. 2, sealing members 66, 67 are attached to both axial ends of the support ring 62, and the respective sealing members 66, 67 are incorporated into accommodating grooves that are formed in an outer peripheral surface of the support ring 62. As shown in FIG. 3, an annular supply/discharge passage 71 is formed between the both sealing members 66 and 67, and the supply/discharge passage 71 is provided on an outer end surface of each adjusting piston 63, that is, a pressurization-side end surface 63a thereof.

A supply/discharge port 72 communicating with the supply/discharge passage 71 is provided in the movable ring 35, and the supply/discharge port 72 communicates with an external air pressure source. As shown in FIG. 1, the supply/discharge port 72 is connected to an air pressure source A by a pipe 29a, and the pipe 29a is provided with a pressure control valve 68 and a direction control valve 69. When the direction control valve 69 is turned on to supply compressed air to the supply/discharge passage 71 from the supply/discharge port 72, a pressure is applied to the pressurization-side end surface 63a of each adjusting piston 63 and the four adjusting pistons 63 project inward in the radial direction of the support ring 62. Consequently, an inner end surface of the adjusting piston 63, that is, an abutment-side end surface 63b abuts on the flat surface 31d of the fastening holder 31. At this time, the flat surface 31d of the fastening holder 31 and the abutment-side end surface 63b of the adjusting piston 63 are substantially parallel, and the flat surface 31d is perpendicular to a protruding direction of the adjusting piston 63. In this way, the second holding mechanism 61 has the adjusting piston 63 which is a fluid pressure operating mechanism.

When the abutment-side end surfaces 63b of all the adjusting pistons 63 abut on the flat surface 31d of the fastening holder 31 under the condition that the force in the first direction is not applied to the mounting plate 12, a gap between the inner peripheral surface of the support ring 62 and the outer peripheral surface of the fastening holder 31 is substantially uniform over the entire outer peripheral surface of the fastening holder 31. Consequently, the central axes O2 of the movable ring 35 and the mounting plate 12 conform with the central axis O1 of the piston rod 25, and become an aligned state. A state where the first holding mechanism 53 is not operating and the second holding mechanism 61 is operating (ON) is set as a temporary holding mode. In this temporary holding mode, the force in the first direction is offset (canceled) by the second holding force. Then, the central axis O1 and the central axis O2 are aligned by the second holding force. The number of adjusting pistons 63 is not limited to four, and alignment can be performed if at least three are provided. The total pressure receiving area of the pressurization-side end surface 63a of each adjusting piston 63 is smaller than a pressure receiving area of the lock piston 17. That is, the second holding force is smaller in strength than the first holding force.

When the movable ring 35 abuts on the outer peripheral surface of the ring portion 31a of the fastening holder 31 via the support ring 62, an amount of transfer of the mounting plate 12 becomes the maximum value. FIG. 6 shows a state where the amount of transfer of the mounting plate 12 has reached the maximum value.

FIG. 6 shows a state where the central axis of the alignment device 10a is horizontal, that is, the central axis O1 and the central axis O2 are each held horizontally and the mounting plate 12 is displaced in the radial direction of the support base 11 due to its own weight. As shown in FIG. 6, when the support ring 62 abuts on the outer peripheral surface of the fastening holder 31, an amount of deviation between the central axis O1 of the support base 11 and the central axis O2 of the mounting plate 12, that is, a transfer amount E of the mounting plate 12 becomes the maximum value.

Figure 7:
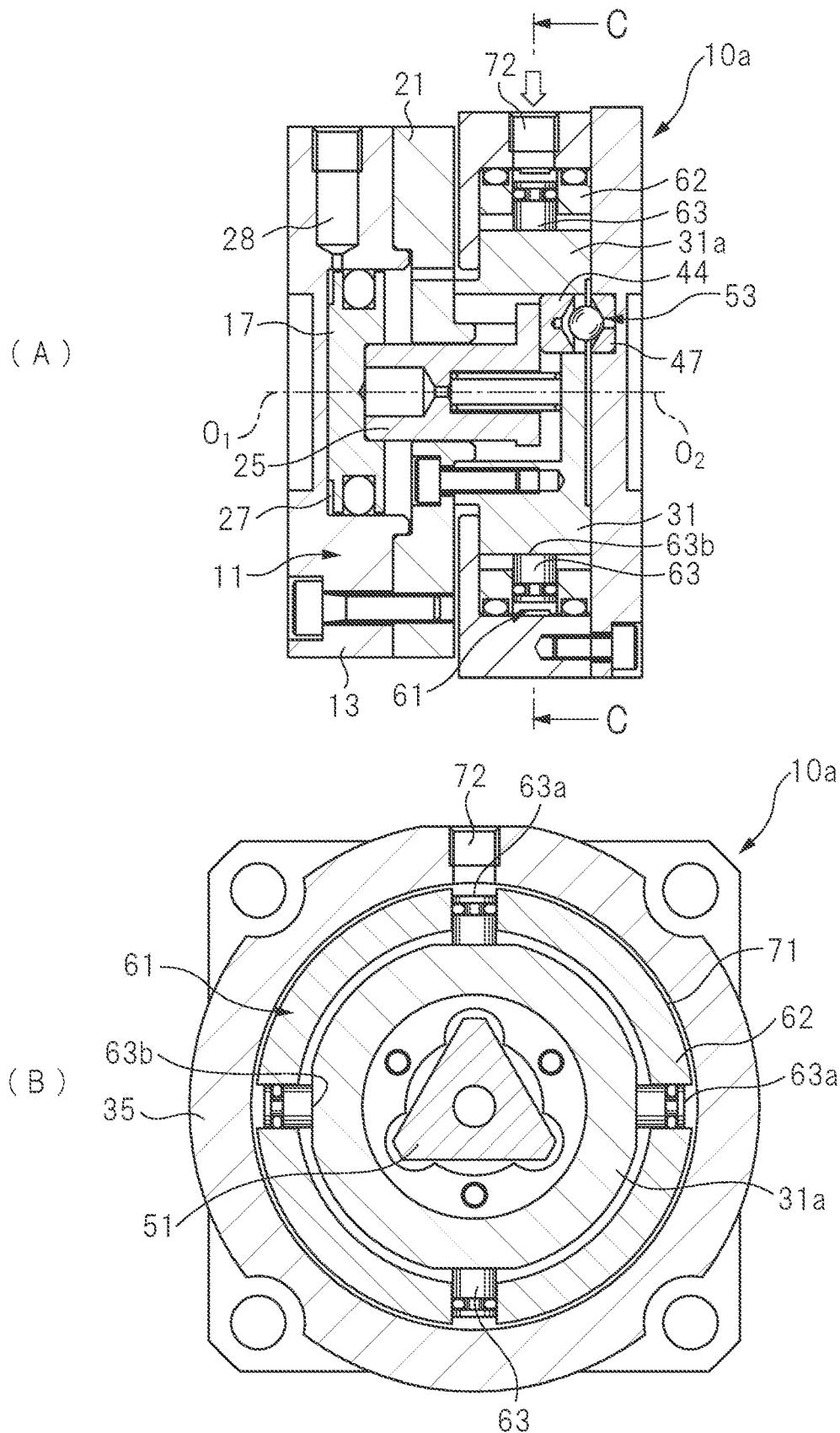
FIG. 7(A) is a vertically sectional view showing a state where a second holding mechanism is operated.
FIG. 7(B) is a sectional view taken along line C-C of FIG. 7(A)

FIG. 7 shows a state where, under the condition that the central axis of the alignment device 10a is horizontal, that is, the central axis O1 and the central axis O2 are each held horizontally, the abutment-side end faces 63b of the four adjusting pistons 63 abut on the flat surface 31d by supplying the compressed air from the supply/discharge port 72 to the supply/discharge passage 71. Under this state, a pressure is applied to the mounting plate 12 in a direction in which the central axis O2 of the mounting plate 12 conforms with the central axis O1 of the support base 11 due to a pressure of the compressed air applied to the respective pressurization-side end surfaces 63a. Consequently, the mounting plate 12, which has been displaced by the transfer amount E below the central axis O1 of the support base 11 due to the weight of the mounting plate 12, leads to, against its own weight, a state where the central axis O2 conforms with the central axis O1. Even if the gripping member is attached to the mounting plate 12, the central axis O2 can be caused to conform (coincide) with the central axis O1 by the pressure of the compressed air applied to the supply/discharge passage 71.

In the temporary holding mode in which the second holding mechanism 61 is driven, the mounting plate 12 is not locked, so that addition of a force larger than the second holding force, that is, a force larger than lords and/or their weights of the mounting plate 12 and the like including the gripping member makes it possible for the mounting plate to transfer in the movable direction. Then, when the force is removed, the mounting plate 12 is aligned toward a position where the central axis O1 and the central axis O2 conforms with each other by the second holding force.

Gripping members having various loads are attached to the mounting plate 12 depending on a usage pattern of the alignment device 10a. When the alignment device 10a is used in a horizontal state or at an inclined posture, the first-direction force applied to the mounting plate 12 changes depending on the load of the gripping member. By changing the pressure of the compressed air with the pressure control valve 68 according to the load or the like of the gripping member, any of the various gripping members having different loads can be attached to the same alignment device 10a. That is, the second holding force of the second holding mechanism 61 is arbitrarily variably set to such an extent as to offset the first-direction force applied to the mounting plate 12.

In this way, the mounting plate 12 is preliminarily aligned with respect to the support base 11 so that both central axes conform with each other by the second holding mechanism 61. By a preliminary alignment force, the first-direction force applied to the mounting plate 12 is offset while the alignment device 10a is held in the horizontal direction or the like. Moreover, under this state, if the first holding mechanism 53 is not operated, the mounting plate 12 can be transferred in the movable direction by applying an external force to the mounting plate 12.

FIG. 8 is a horizontally sectional view showing a state where the second holding mechanism 61 is operated, that is, a state where the mounting plate 12 is transferred under the temporary holding mode. FIG. 8(A) shows a state where the mounting plate 12 is transferred rightward in the figure, and FIG. 8(B) shows a state where the mounting plate 12 is transferred vertically (in an up-and-down direction). In this way, if the first holding mechanism 53 is not operated, the mounting plate 12 can be transferred by applying an external force to the mounting plate 12. Therefore, in this state, the positioning error can be absorbed.

FIG. 9 shows a state where the first holding mechanism 53 and the second holding mechanism 61 are operated, that is, shows the holding mode. By operating the first holding mechanism 53, the central axis O2 of the mounting plate 12 conforms with the central axis O1 of the support base 11 and the mounting plate 12 is aligned and locked. Under this state, even if the operation of the second holding mechanism 61 is stopped by discharging the compressed air outside from the supply/discharge port 72, such a state is held that both central axes are aligned by the first holding mechanism 53. In the state where the first holding mechanism 53 is operating, even if an external force is applied to the mounting plate 12, the mounting plate 12 is locked and so does not transfer. That is, the alignment device 10a cannot absorb the positioning error.

Incidentally, the central axis O1 of the support base 11 and the central axis O2 of the mounting plate 12 are used as reference axes, but when the first holding mechanism 53 is operated and if their reference axes are set by setting, as a reference, a position where the mounting plate 12 is positioned with respect to the support base 11, the reference axis is not limited to each of their central axes.

Next, a case where the above-mentioned alignment device 10a is used to grip the workpiece by the gripping member and the workpiece is positioned by the conveying device will be described with reference to FIGS. 10 and 11.

Figure 10:
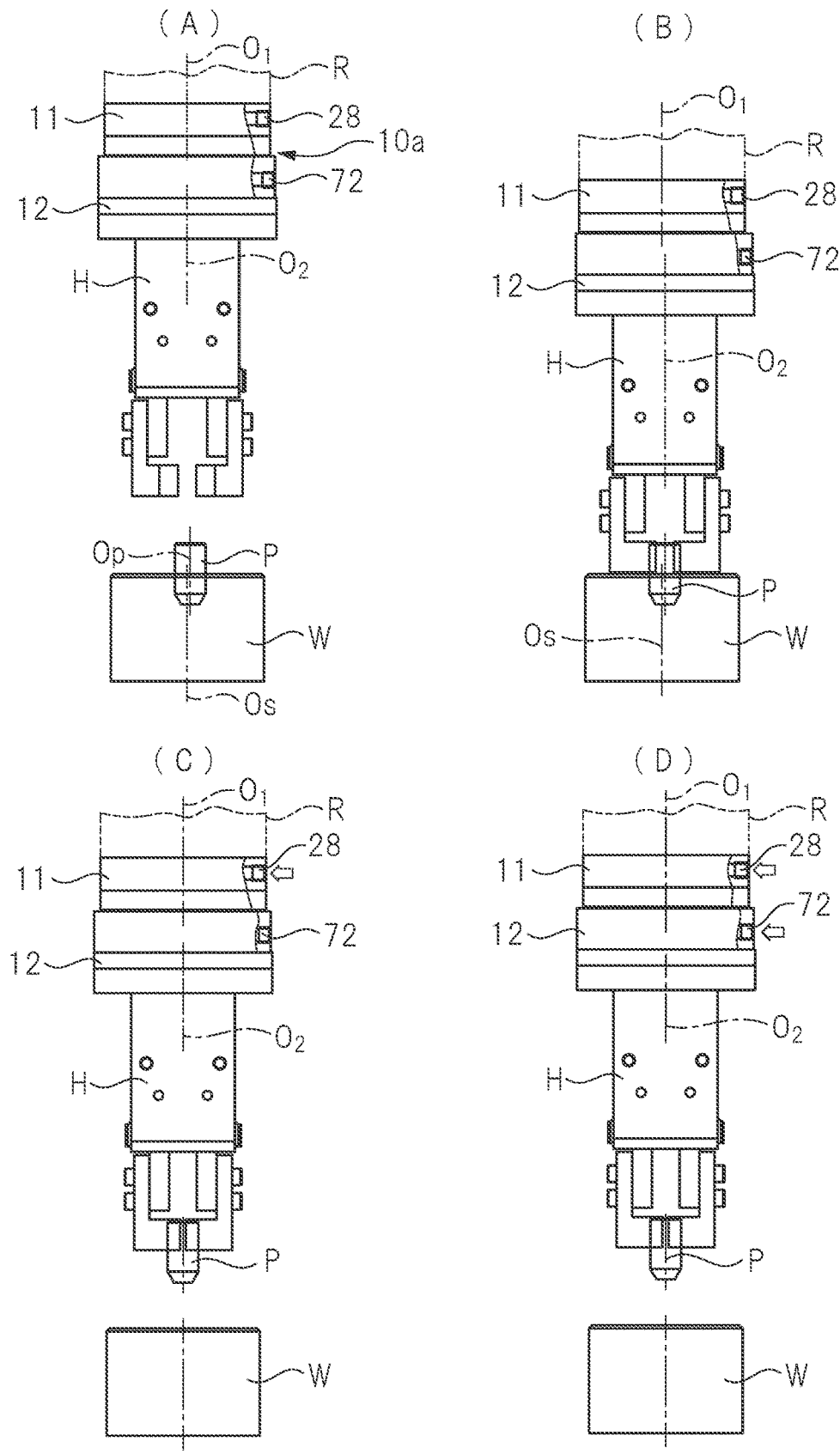
FIG. 10(A) is a view showing a process of transferring an air chuck by a robot arm to grip a pin which is a workpiece.
FIG. 10(B) is a view showing the process of transferring the air chuck by the robot arm to grip the pin which is a workpiece.
FIG. 10(C) is a view showing the process of transferring the air chuck by the robot arm to grip the pin which is a workpiece.
FIG. 10(D) is a view showing the process of transferring the air chuck by the robot arm to grip the pin which is a workpiece.

FIGS. 10 and 11 each show a case where the robot arm R as a conveying device is attached to the support base 11 of the alignment device 10a and the air chuck H as a gripping member is attached to the mounting plate 12. In order for the air chuck H to grip the pin P vertically accommodated in a workpiece accommodating portion W, the air chuck H is conveyed (transported) to a position of the pin P by the robot arm R as shown in FIG. 10(A). At this time, the central axis O2 of the mounting plate 12 of the alignment device 10a is set to be coaxial with the central axis O1 of the support base 11. However, compressed air is not supplied to the supply/discharge port 28 and the supply/discharge port 72, and the first holding mechanism 53 and the second holding mechanism 61 are not operating. An off state in which the first holding mechanism 53 and the second holding mechanism 61 are not driven is set as the non-holding mode. Under this non-holding mode, the air chuck H is conveyed by the robot arm R so that the central axis O1 of the support base 11 becomes coaxial with a reference position Os of the workpiece accommodating portion W.

It is assumed that a central axis Op of the pin P is deviated from the reference position Os as shown in FIG. 10(A). At this time, the central axis Op of the pin P is in a state in which an error occurs with respect to the central axis O1 of the support base 11 and the central axis O2 of the mounting plate 12. In this state, the air chuck H is approximated to the pin P. At this time, since the first holding mechanism 53 is not operating, the mounting plate 12 transfers in the movable direction by an aligning function of the alignment device 10a as shown in FIG. 10(B). Further, since the second holding mechanism 61 is not operating either, a force for causing the mounting plate 12 to transfer in the movable direction may be smaller than the second holding force. Thus, the air chuck H can grip the pin P by absorbing the error between the central axis O1 of the support base 11 and the central axis Op of the pin P.

When the air chuck H is raised by the robot arm R, the pin P is gripped by the air chuck H and taken out from the workpiece accommodating portion W. After the pin P is taken out, as shown in FIG. 10(C), when compressed air is supplied to the supply/discharge port 28, the first holding mechanism 53 is driven. Consequently, the mounting plate 12 and the air chuck H are aligned so that the central axis O2 of the mounting plate 12 conforms (coincides) with the central axis O1 of the support base 11, and the air chuck H is fastened to the robot arm R via the alignment device 10a. As shown in FIG. 10(D), when the compressed air is supplied to the supply/discharge port 72, the second holding mechanism 61 is driven.

Next, in order to insert the pin P, which is gripped by the air chuck H, into a horizontal insertion hole J as shown in FIG. 11(B), a posture of the air chuck H is changed horizontally by the robot arm R as shown in FIG. 11(A). At this time, the first holding mechanism 53 and the second holding mechanism 61 are held in the driven states.

Next, the pin P is inserted into the insertion hole J by the robot arm R with the pin P opposing the insertion hole J. At this time, since the second holding mechanism 61 remains operated and is set, the first-direction force applied to the mounting plate 12 is canceled (offset) and the central axis O2 of the mounting plate 12 is aligned coaxially with the central axis O1 of the support base 11.

Further, at this time, the operation of the first holding mechanism 53 is released without supplying the compressed air to the supply/discharge port 28. In this way, even if the first holding mechanism 53 is released, the second holding mechanism 61 is operating, so that both the central axes O1 and O2 are held in a coaxial state. Under this state, even if the central axis of the pin P and a central axis of the insertion hole J do not conform with each other, the alignment device 10a absorbs the error and the pin P can be inserted into the insertion hole J by the air chuck.

In this way, since the force in the first direction is canceled by the second holding mechanism 61, the alignment device 10a can also be used with its reference axis positioned horizontally. Further, even when the second holding mechanism 61 is operated, the positioning error can be absorbed by releasing the first holding mechanism 53.

FIGS. 12 and 13 each show an alignment device 10b according to another embodiment, and members having commonality with the members in the above-mentioned alignment device 10a are denoted by the same reference numerals. In this alignment device 10b, a supply/discharge port 72 for operating the second holding mechanism 61 is formed in the base block 13 of the support base 11. A communication passage 73 for causing a supply/discharge passage 71 formed between the support ring 62 and the movable ring 35 to communicate with the supply/discharge port 72 is formed in the support base 11 and the movable ring 35. A seal member 74 is arranged between the base block 13 and the support disk 21, and a seal member 75 is arranged between the support disk 21 and the movable ring 35. This prevents air from leaking from the communication passage 73.

FIG. 12 shows a state in which the central axis O1 of the mounting plate 12 is coaxial with the central axis O2 of the support base 11, and FIG. 13 shows a state in which the mounting plate 12 is displaced by its own weight. In this alignment device 10b, the position of the supply/discharge port 72 is different from that of the alignment device 10a, but other structures are the same as those of the alignment device 10a.

FIG. 14 shows an alignment device 10c which is still another embodiment, and members having commonality with the members in the above-mentioned alignment devices 10a, 10b are denoted by the same reference numerals.

In the alignment device 10c, the second holding mechanism 61 is formed by a flexible tube 76 expandable/contractable in an aligning direction, unlike the above-mentioned case. The flexible tube 76 is shaped of an elastically deformable member such as rubber. The flexible tube 76 is provided with a connection port 77, and the connection port 77 is connected to the supply/discharge port 72. Adjusting a pressure of compressed air supplied to the flexible tube 76 from outside makes it possible to set a load when the mounting plate 12 transfers in the radial direction of the support base 11. The second holding mechanism 61 in the alignment device 10c is configured by a fluid pressure actuating mechanism composed of a flexible tube 76.

The present invention is not limited to the above-described embodiments, and various modifications can be made without departing from the scope thereof.

This alignment device is applied to a conveying device for transporting an object to be transported. The alignment device is provided with a chuck for gripping the transported object, and the alignment device absorbs a positioning error in gripping the transported object by the chuck or/and in positioning the gripped transported object at a predetermined position.

The invention claimed is:

1. An alignment device comprising:
    a support base having a cylinder hole for incorporating an axially transferable lock piston, the support base being attached to a conveying device;
    a mounting plate transferably abutted in a movable direction on a front surface of a fastening holder that is fixed to the support base, a gripping member being attached to the mounting plate;
    a movable ring provided with a sliding part that is transferably engaged with the fastening holder in the movable direction, the movable ring being fixed to the mounting plate;
    an axis conforming holder arranged between the fastening holder and the mounting plate, and having a first holding force that is driven by the lock piston and causes a reference axis of the mounting plate to conform with and lock a reference axis of the fastening holder; and
    a force canceling holder provided between the fastening holder and the movable ring, and having a second holding force that admits a state where the mounting plate is transferable in the movable direction and that cancels a first-direction force applied to the mounting plate, the first-direction force being a force in a direction of shifting the reference axis of the mounting plate from the reference axis of the fastening holder,
    wherein the force canceling holder is turned on and off by a fluid pressure actuating mechanism.

2. The alignment device according to claim 1, further comprising:
    a holding mode that causes the axis conforming holder to be turned on and that applies the first holding force for causing the reference axis of the mounting plate to conform with the reference axis of the fastening holder; and
    a temporary holding mode that causes the axis conforming holder to be turned off and the force canceling holder to be turned on and that applies the second holding force for canceling the first-direction force,
    wherein the second holding force is smaller than the first holding force, and the mounting plate is transferable in the movable direction by a force larger than the second holding force in the temporary holding mode.

3. The alignment device according to claim 2, further comprising a non-holding mode which causes the axis conforming holder and the force canceling holder to be turned off and that makes the mounting plate transferable in the movable direction.

4. The alignment device according to claim 1, wherein the second holding force of the force canceling holder is variably set depending on the first-direction force.

5. The alignment device according to claim 1, wherein the force canceling holder includes:

a support ring fixed inside the movable ring;
    at least three adjusting pistons transferably attached to the support ring in the movable direction;
    a supply/discharge passage formed between the support ring and the movable ring and communicating with a pressurization-side end surface of each of the adjusting pistons; and
    a supply/discharge port communicating with the supply/discharge passage.

6. The alignment device according to claim 5, wherein the supply/discharge port is provided on the movable ring or the support base.

7. The alignment device according to claim 5, wherein a pressure control valve for adjusting a pressure of air supplied to the supply/discharge port is provided in a pipe connecting the supply/discharge port and an air pressure source.

8. The alignment device according to claim 1, wherein the second holding mechanism has:
    a flexible tube arranged between the fastening holder and the movable ring so as to be expandable/contractable in the movable direction; and
    a supply/discharge port communicating with the flexible tube.

9. The alignment device according to claim 1, wherein the axis conforming holder includes:
    a plurality of first holding portions each provided with a first tapered surface and attached to the mounting plate;
    a second holding portion provided with a second tapered surface that is opposed to the first tapered surface via a ball, the second holding portion being transferably provided on the fastening holder in a transferring direction of the lock piston; and
    a piston rod provided on the lock piston and having a flange that is abutted on the second first holding portion.

10. An alignment device comprising:
    a support base having a cylinder hole for incorporating an axially transferable lock piston, the support base being attached to a conveying device;
    a mounting plate transferably abutted in a movable direction on a front surface of a fastening holder that is fixed to the support base, a gripping member being attached to the mounting plate;
    a movable ring provided with a sliding part that is transferably engaged with the fastening holder in the movable direction, the movable ring being fixed to the mounting plate;
    an axis conforming holder arranged between the fastening holder and the mounting plate, and having a first holding force that is driven by the lock piston and causes a reference axis of the mounting plate to conform with and lock a reference axis of the fastening holder; and
    a force canceling holder provided between the fastening holder and the movable ring, and having a second holding force that admits a state where the mounting plate is transferable in the movable direction and that cancels a first-direction force applied to the mounting plate, the first-direction force being a force in a direction of shifting the reference axis of the mounting plate from the reference axis of the fastening holder,
    wherein the force canceling holder is turned on and off by a fluid pressure actuating mechanism, the force canceling holder includes:
- a support ring fixed inside the movable ring;
- at least three adjusting pins transferably attached to the support ring in the movable direction;
- a supply/discharge passage formed between the support ring and the movable ring and communicating with a pressurization-side end surface of each of the adjusting pistons; and
- a supply/discharge port communicating with the supply/discharge passage, and the an axis conforming holder includes:
- a plurality of first holding portions each provided with a tapered surface and attached to the mounting plate;
- a second holding portion provided with a tapered surface that is opposed to the tapered surface via a ball, the second holding portion being transferably provided on the fastening holder in a transferring direction of the lock piston; and
- a piston rod provided on the lock piston and having a flange that is abutted on the first holding portion.

\* \* \* \* \*